US012066333B2

(12) United States Patent
Takuwa

(10) Patent No.: US 12,066,333 B2
(45) Date of Patent: Aug. 20, 2024

(54) IMAGE FORMING DEVICE

(71) Applicant: TOSHIBA TEC KABUSHIKI KAISHA, Tokyo (JP)

(72) Inventor: Noriyuki Takuwa, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 73 days.

(21) Appl. No.: 17/895,976

(22) Filed: Aug. 25, 2022

(65) Prior Publication Data

US 2023/0147095 A1 May 11, 2023

(30) Foreign Application Priority Data

Nov. 5, 2021 (JP) ................................ 2021-181147

(51) Int. Cl.
*G01J 5/07* (2022.01)

(52) U.S. Cl.
CPC ....................... *G01J 5/07* (2022.01)

(58) Field of Classification Search
CPC .. G01J 5/07; G01J 5/025; G01J 5/0025; G01J 5/0275; G01J 5/041; G01J 5/084; G01J 5/34; G03G 21/00; G03G 15/00
See application file for complete search history.

(56) References Cited

U.S. PATENT DOCUMENTS

| 11,758,062 | B1* | 9/2023 | Takuwa | H04N 1/00891 358/1.15 |
| 2012/0327458 | A1* | 12/2012 | Baba | G03G 15/5016 358/1.15 |
| 2014/0140716 | A1* | 5/2014 | Ogata | H04N 1/00323 399/81 |
| 2015/0006927 | A1* | 1/2015 | Ono | G06F 1/3234 713/320 |
| 2019/0355355 | A1* | 11/2019 | Tomita | G06F 3/0412 |
| 2022/0191342 | A1* | 6/2022 | Hiraike | H04N 1/00477 |
| 2022/0214644 | A1* | 7/2022 | Toda | H01Q 21/12 |
| 2023/0056361 | A1* | 2/2023 | Iizuka | H04N 1/00631 |
| 2023/0147095 | A1* | 5/2023 | Takuwa | G01J 5/0275 358/1.1 |
| 2023/0269335 | A1* | 8/2023 | Takuwa | H04N 1/00352 358/1.15 |

FOREIGN PATENT DOCUMENTS

| JP | 2014030076 A | 2/2014 |
| JP | 2017074785 A | 4/2017 |

* cited by examiner

*Primary Examiner* — David P Porta
*Assistant Examiner* — Gisselle M Gutierrez
(74) *Attorney, Agent, or Firm* — Kim & Stewart LLP

(57) ABSTRACT

An image forming device according to an embodiment includes a human sensor configured to detect a person in front of the device and an adjustment mechanism configured to move the human sensor to adjust a detection distance. A sensor cover panel is provided for an exterior of the device and is configured to cover the human sensor and the adjustment mechanism. The adjustment mechanism includes an operator element that is manually operable by a user to adjust the detection distance. The human sensor and adjustment mechanism are disposed behind the sensor cover panel. The sensor cover panel has a detection window through which a detection wave for the human sensor can pass. The sensor cover panel has an opening through which the operator element is exposed so as to be seen by a user from both the front side and a lateral side of the device.

20 Claims, 12 Drawing Sheets

IMAGE FORMING DEVICE

CROSS-REFERENCE TO RELATED APPLICATION

This application is based upon and claims the benefit of priority from Japanese Patent Application No. 2021-181147, filed Nov. 5, 2021, the entire contents of which are incorporated herein by reference.

FIELD

Embodiments described herein relate to an image forming device.

BACKGROUND

An image forming device including a sensor ("human sensor") to detect the presence of a person is known. The image forming device including a human sensor can be switched to a power saving mode when not used for a long time, and then returned to a normal mode when a person is detected by the human sensor. Accordingly, power consumption can be reduced, and the apparent return time to the normal mode from a power saving mode is shortened for the user.

DETAILED DESCRIPTION

In general, according to one embodiment, an image forming device that allows a user to adjust a detection distance of a human sensor is provided.

According to one embodiment, an image forming device includes a human sensor configured to detect a person in front of the image forming device, an adjustment mechanism configured to move the human sensor to adjust a detection distance of the human sensor, and a sensor cover panel on an exterior of the image forming device. The sensor cover panel is configured to cover the human sensor and the adjustment mechanism when installed on the image forming device. The adjustment mechanism includes an operator element manually operable by a user to adjust the detection distance. The human sensor and the adjustment mechanism are disposed behind the sensor cover panel. The sensor cover panel has a detection window through which a detection wave for the human sensor can pass. The sensor cover panel also has an opening through which the operator element is exposed so as to be seen by a user from both the front side and a lateral side of the image forming device.

Figure 1:
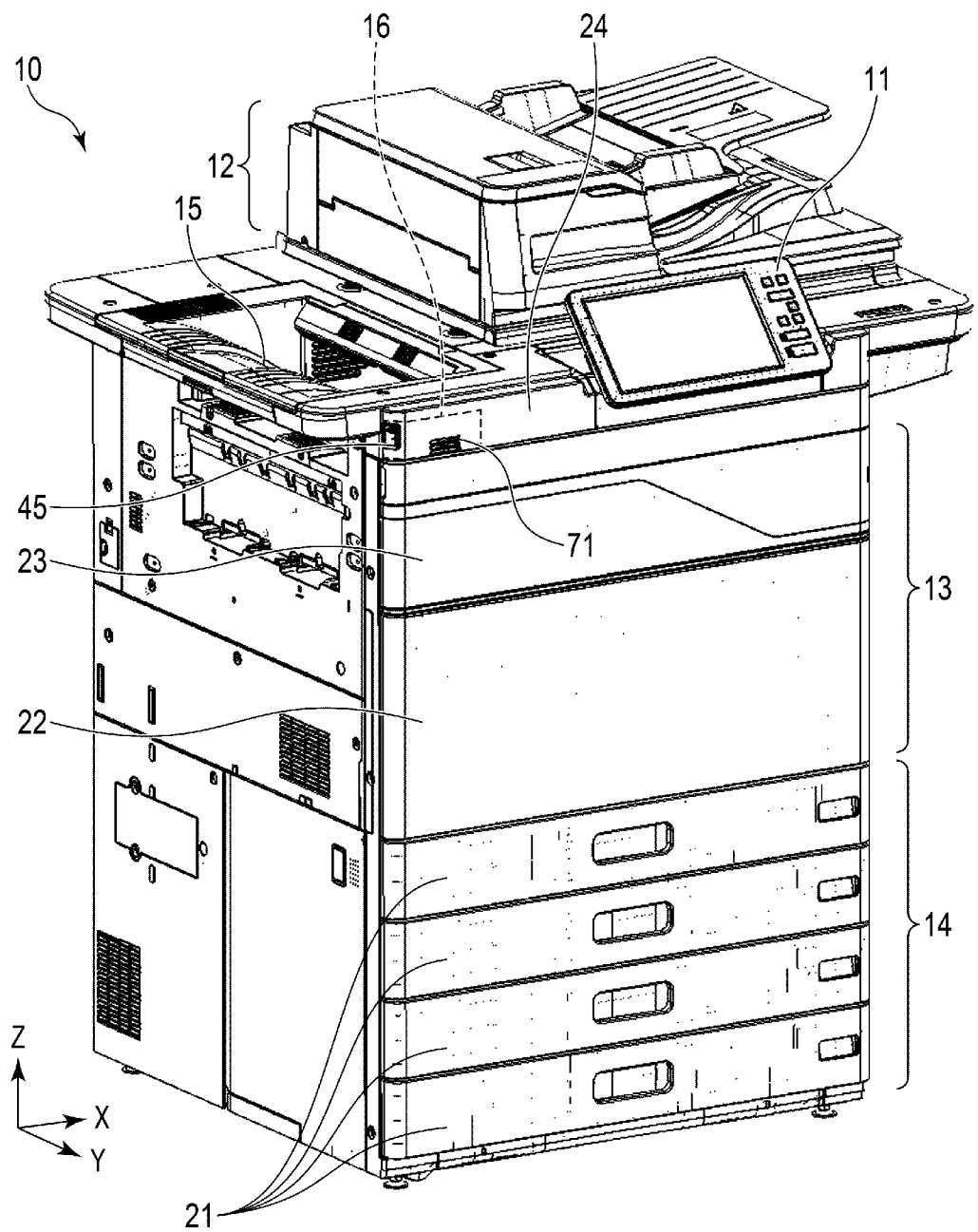
FIG. 1 is a perspective view of an image forming device according to an embodiment.
Figure 2:
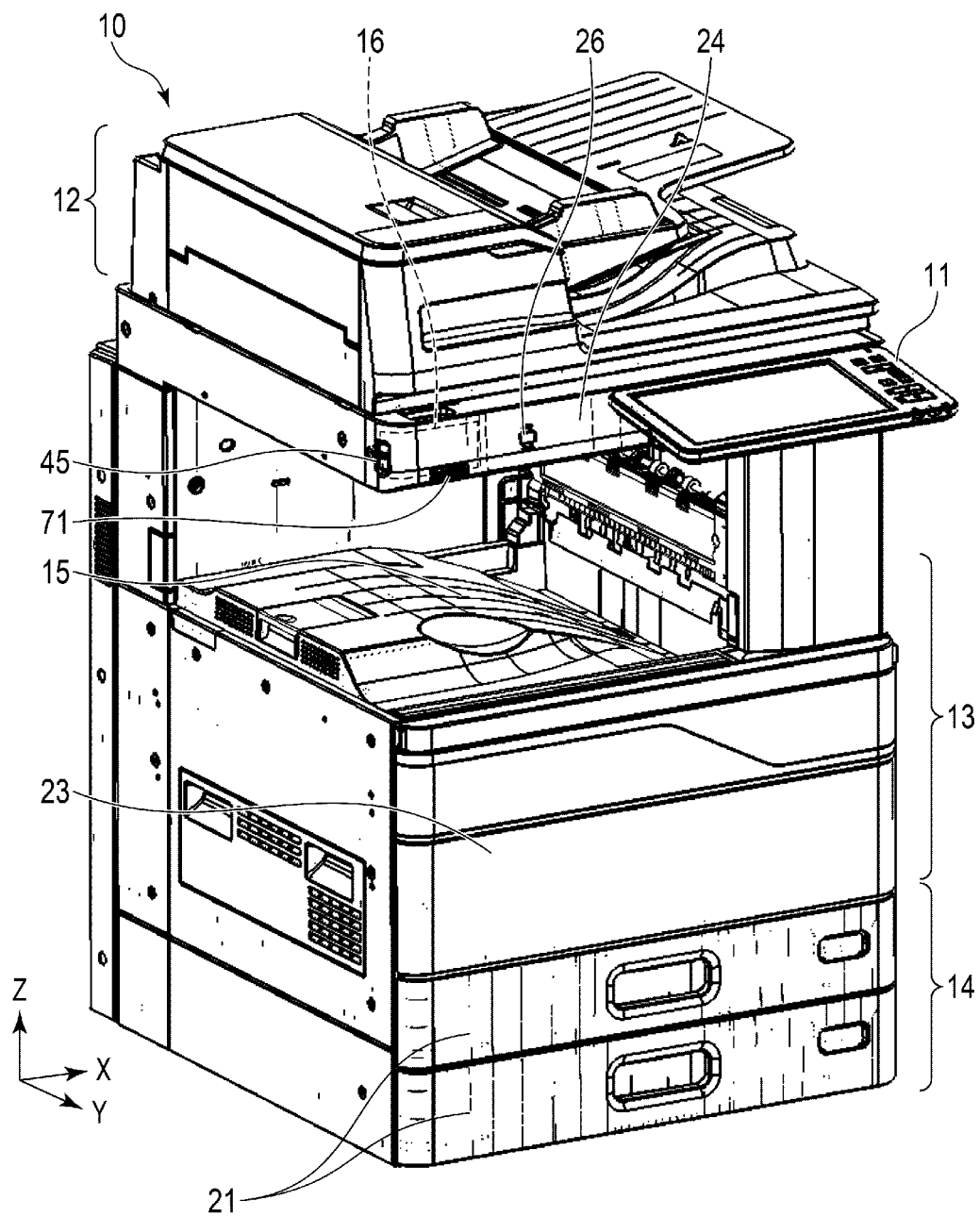
FIG. 2 is a perspective view of another image forming device according to an embodiment.

Hereinafter, certain examples of an image forming device according to an embodiment will be described with reference to drawings. FIG. 1 is a perspective view of an image forming device 10 of a first type according to an embodiment. FIG. 2 is a perspective view of an image forming device 10 of a second type according to an embodiment.

In each of the drawings, the depicted dimensions, scales, and relative dimensions of each depicted element, component, unit, aspect, or the like may be appropriately changed. In addition, the drawings, certain aspects of configuration may be omitted for the purpose of description.

In order to define directions for purposes of description, an XYZ orthogonal coordinate system is set as illustrated in FIGS. 1 and 2. The Z direction may be referred to as a vertical direction, a longitudinal direction, or an upper-lower direction. A +Z direction is an upper side (upward) direction, and a −Z direction is a lower side (downward) direction. An X direction and a Y direction may be referred to as a horizontal direction or a transverse direction. In general, the Y direction is taken as a depth direction or a front-rear direction of the image forming device 10. A +Y direction referred to as a front side (frontward) direction, and a −Y direction referred to as a rear side (rearward) direction. The X direction is taken as a width direction or a left-right direction of the image forming device 10. The left-right direction is based on a case of viewing the image forming device 10 from the front side, a +X direction referred to as a right side (rightward) direction, and a −X direction referred to as a left side (leftward) direction. The right side or the left side is also referred to as a lateral side. In the following description, all expressions regarding directions follow the XYZ orthogonal coordinate system, but the establishment of the coordinate system is not a limitation.

Regarding the image forming device 10 of the first type in FIG. 1 and the image forming device 10 of the second type in FIG. 2, certain device details are different, but basic configurations are the same overall. Therefore, in the following description, the two image forming devices 10 are described using a same reference numeral without being distinguished from each other.

The image forming device 10 is, for example, a multi function peripheral (MFP), and has a plurality of functions, for example, a print function, a scan function, and a copy function.

The image forming device 10 includes an operation panel 11 (input panel), a scanner unit 12 (a scanner), an image forming unit 13 (a printer), a sheet feeding unit 14, a sheet discharge unit 15 (sheet discharge tray), and a human sensor unit 16.

The operation panel 11 is disposed on, for example, an upper and front side of the image forming unit 13. The operation panel 11 receives an execution instruction (operation instruction) and setting information for various functions of the image forming device 10. For example, the operation panel 11 includes a touch panel, a push button, and the like. The operation panel 11 is disposed at a height at which a person of an average height can easily operate the operation panel 11.

The scanner unit 12 is disposed at, for example, a position located on the upper side of the image forming unit 13 and a rear side of the operation panel 11. The scanner unit 12 uses a sensor such as a contact image sensor (CIS) or a charge coupled device (CCD) to read an image recorded on a document or the like and generate image data accordingly.

The sheet feeding unit 14 includes sheet feeding cassettes 21 in which sheets are accommodated, and feeds a sheet from one of the sheet feeding cassettes 21 to the image forming unit 13.

The image forming unit 13 is disposed on an upper portion of the sheet feeding unit 14. The image forming unit 13 forms, based on the image data read by the scanner unit 12 or image data received from an external device, an image on the sheet fed from the sheet feeding unit 14 by using toner. Therefore, the image forming unit 13 includes a photoreceptor unit, a toner unit, and the like. The image forming unit 13 discharges the sheet on which the image has been formed toward the left side and to the sheet discharge unit 15.

The sheet discharge unit 15 receives and stores the sheet on which the image has been formed from the image forming unit 13.

The human sensor unit 16 is disposed near the upper side of the image forming unit 13. The human sensor unit 16 detects a person within a fixed range in the front of the image forming device 10. The human sensor unit 16 can adjust the maximum distance (hereinafter, referred to as a detection distance) in front of the image forming unit at which a person can be detected.

The human sensor unit 16 is disposed to a lateral side, for example, the left side of the operation panel 11. The human sensor unit 16 is generally disposed at substantially the same height as the operation panel 11. Here, the matter that the human sensor unit 16 is disposed at substantially the same height as the operation panel 11 means that, for example, a height range occupied by the human sensor unit 16 and a height range occupied by the operation panel 11 at least partially overlap.

The image forming device 10 includes a cover for an exterior. The image forming device 10 of the first type depicted in FIG. 1 includes a first front cover 22, a second front cover 23, and a sensor cover 24. The image forming device 10 of the second type depicted in FIG. 2 does not include the first front cover 22, but does include the second front cover 23 and the sensor cover 24.

The sensor cover 24 covers the human sensor unit 16. In the image forming device 10 in FIG. 1, the first front cover 22 and the second front cover 23 cover the image forming unit 13. In the image forming device 10 in FIG. 2, just the second front cover 23 covers the image forming unit 13.

The first front cover 22 can be fixed without being openable and closable by a user in normal operation. The second front cover 23 is openable and closable for, for example, replacement of the toner unit or the photoreceptor unit, dealing with sheet jams, and maintenance.

In a state in which all of the sheet feeding cassettes 21 and the second front cover 23 are closed, the image forming unit 13 and the sheet feeding unit 14 form a substantially rectangular parallelepiped housing.

As compared with the image forming device 10 of the second type in FIG. 2, the image forming device 10 of the first type in FIG. 1 needs a larger installation area and is a device of a large type. In other words, as compared with the image forming device 10 in FIG. 1, the image forming device 10 in FIG. 2 needs a smaller installation area and is a device of a small type.

In the image forming device 10 in FIG. 1, the sheet feeding unit 14 includes four sheet feeding cassettes 21, and on the upper side of the image forming unit 13, the sheet discharge unit 15 is provided on a left side of the scanner unit 12. The operation panel 11 is disposed near a center along the width direction. The human sensor unit 16 can be disposed frontward of the operation panel 11.

The first front cover 22 and the second front cover 23 constitute parts of a front panel. Front surface portions of the sheet feeding cassettes 21 also constitute a part of the front panel. The first front cover 22, the second front cover 23, and the front surface portions of the sheet feeding cassettes 21 can be, for example, substantially flush with each other and are parallel with each other along a ZX plane, when all of the sheet feeding cassettes 21 and the second front cover 23 are closed.

A front surface portion of the sensor cover 24 is substantially flush with at least a part of, the first front cover 22, the second front cover 23, and the front surface portions of the sheet feeding cassettes 21 in a closed state, and is along the same ZX plane.

On the other hand, in the image forming device 10 in FIG. 2, the sheet feeding unit 14 includes two sheet feeding cassettes 21, and the sheet discharge unit 15 is provided between the scanner unit 12 and the image forming unit 13. The operation panel 11 is disposed near a right side in the width direction. The human sensor unit 16 is disposed rearward of the operation panel 11.

The second front cover 23 constitutes a part of a front panel. The front surface portions of the sheet feeding cassettes 21 also constitute a part of the front panel. The second front cover 23 and the front surface portions of the sheet feeding cassettes 21 are, for example, substantially flush with each other and parallel along a ZX plane, when all of the sheet feeding cassettes 21 and the second front cover 23 are closed.

The front surface portion of the sensor cover 24 is substantially flush with at least a part of, the second front cover 23 and the front surface portions of the sheet feeding cassettes 21 in a closed state, and is along the same ZX plane.

The image forming device 10 in FIG. 2 includes a card reader 26. The card reader 26 receives user authentication information from an ID card or the like. The card reader 26 is disposed between the operation panel 11 and the human sensor unit 16 in the width direction, and is disposed at substantially the same height as the operation panel 11.

Figure 3:
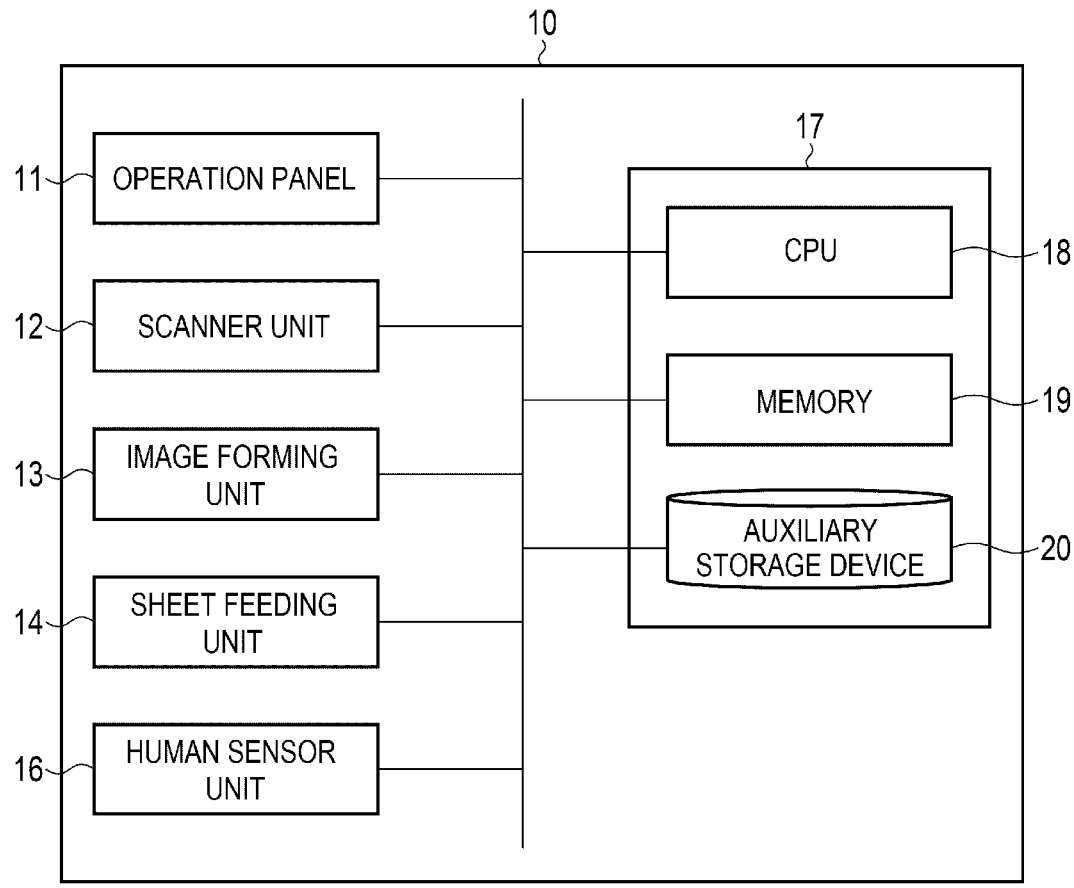
FIG. 3 is a block diagram of an image forming device according to an embodiment.

FIG. 3 is a block diagram of the image forming device 10. The image forming device 10 includes the operation panel 11, the scanner unit 12, the image forming unit 13, the sheet feeding unit 14, the human sensor unit 16, and a control unit 17.

The control unit 17 controls overall operations of the image forming device 10. The control unit 17 includes a central processing unit (CPU) 18, a memory 19, and an auxiliary storage device 20.

The auxiliary storage device 20 permanently stores a program and data necessary for executing various functions of the image forming device 10.

The memory 19 includes a random access memory (RAM) and the like. The memory 19 temporarily stores a program and data necessary for processing executed by the CPU 18.

The CPU 18 receives information from the operation panel 11 and the human sensor unit 16, reads the necessary program and data from the auxiliary storage device 20 into the memory 19, and executes the program to control the scanner unit 12, the image forming unit 13, and the sheet feeding unit 14.

For example, the control unit 17 switches an operation of the image forming device 10 to an operation in a power saving mode when the image forming device 10 is not used for a long time and to an operation in a normal mode when a person is detected by the human sensor unit 16.

Figure 4:
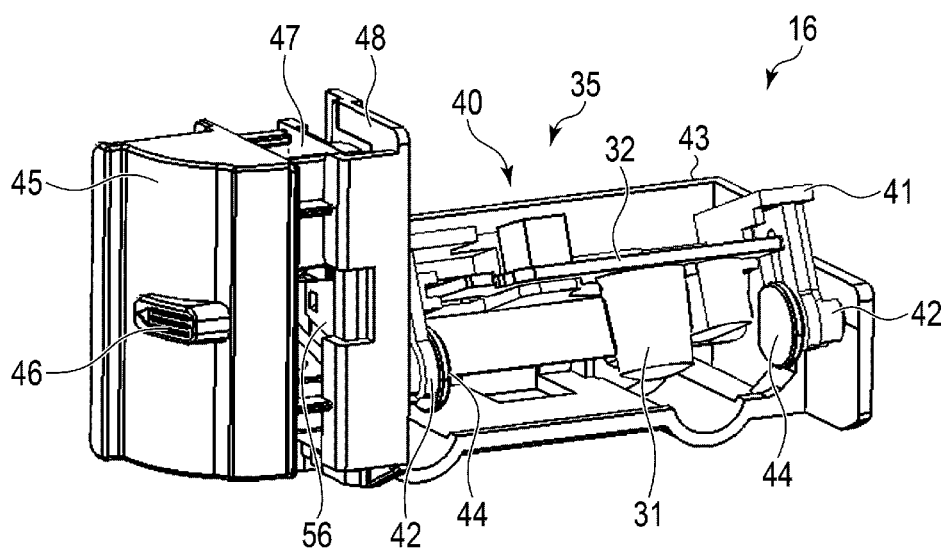
FIG. 4 depicts a human sensor unit as viewed from a front side.
Figure 5:
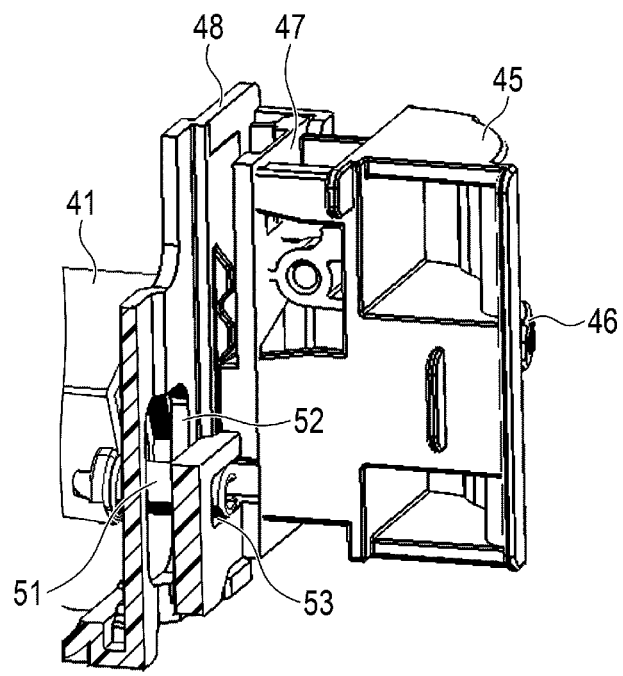
FIG. 5 depicts a left end portion of a human sensor unit as viewed from a rear side.
Figure 6:
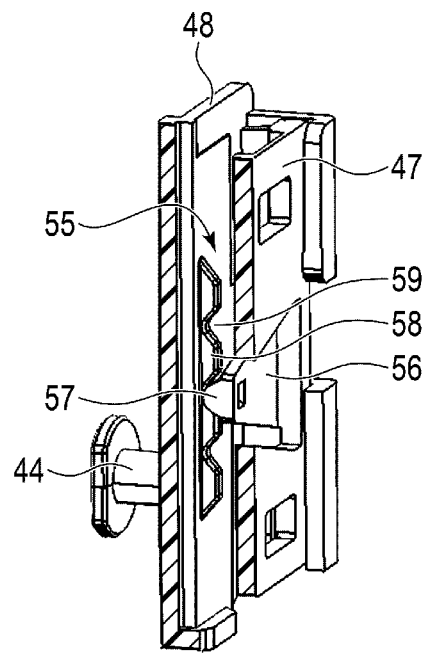
FIG. 6 depicts a slider and a slider support unit as viewed from a rear side.

Next, the human sensor unit 16 will be described with reference to FIGS. 4 to 6. FIG. 4 is a perspective view of the human sensor unit 16 as viewed from the front side. FIG. 5 is a perspective view of a left end portion of the human sensor unit 16 as viewed from the rear side. FIG. 6 is a perspective view of a slider 47 and a slider support unit 48 as viewed from the rear side.

The human sensor unit 16 includes a human sensor 31 that detects a person and an adjustment mechanism 35 that adjusts the detection distance of the human sensor 31.

The human sensor 31 is, for example, a pyroelectric infrared sensor. The pyroelectric infrared sensor uses a pyroelectric effect of pyroelectric ceramics to detect an infrared ray emitted by a person as thermal energy. The human sensor 31 can also detect an object other than a person, but here, the human sensor 31 is referred to as a human sensor for convenience.

The human sensor 31 is mounted on a substrate 32 (e.g., circuit board) on which necessary wiring and the like is formed. The human sensor 31 is vertically mounted with respect to a surface of the substrate 32. The wiring of the substrate 32 is electrically connected to the control unit 17. The human sensor 31 sends a detection signal to the control unit 17 via such wiring.

The human sensor 31 includes a receiving surface on which a detection wave is received. The human sensor 31 detects a person by receiving the detection wave from a person within a predetermined spatial spread range that is centered on an axis orthogonal to the receiving surface.

In the following description, a direction of the axis orthogonal to the receiving surface of the human sensor 31 is referred to as the detection direction of the human sensor 31 for convenience. The range within which the human sensor 31 can detect a person is referred to as the detection range of the human sensor 31 for convenience. The detection range of the human sensor 31 extends, for example, in a conical shape starting from the receiving surface expanding along the detection direction.

The adjustment mechanism 35 adjusts the detection distance of the human sensor 31 by changing the detection direction of the human sensor 31. Specifically, the adjustment mechanism 35 swingably supports the human sensor 31 around an axis extending in the left-right direction, and adjusts the detection distance of the human sensor 31 by changing the detection direction.

The adjustment mechanism 35 includes a substrate holder 41 that holds the substrate 32 and a frame 43 that swingably supports the substrate holders 41. The frame 43 includes a pair of support shafts 44 provided coaxially at left and right end portions. The substrate holder 41 extends in the left-right direction beyond a width (transverse dimension) of the substrate 32, and includes the pair of shaft engaging portions 42 at the left and right end portions, which are to be engaged with the pair of support shafts 44 of the frame 43. Accordingly, the substrate holder 41 is swingable around the support shafts 44 of the frame 43, and the detection direction (pointing angle) of the human sensor 31 is changed according to the swing (angle) of the substrate holder 41. That is, the substrate holder 41 and the frame 43 constitute a swing support mechanism 40 that swingably supports the substrate 32.

The adjustment mechanism 35 includes an operator element 45 (also referred to as "operator 45") that can be manually operated by the user to adjust the detection distance of the human sensor 31. The operator 45 is provided at a left end portion. The operator 45 has a protrusion 46 for ease of operation by the user. The operator 45 is slidable (moveable) in the upper-lower direction.

The adjustment mechanism 35 includes a slider 47 to which the operator 45 is fixed. The frame 43 includes a slider support unit 48 at the left end portion. The slider support unit 48 slidably supports the slider 47 in the upper-lower direction. The slider 47 and the slider support unit 48 constitute a support mechanism that slidably supports the operator 45 in the upper-lower direction.

As illustrated in FIG. 5, the substrate holder 41 has a cylindrical boss 51 that extends to the left side through an opening 52 formed in the slider support unit 48. The slider 47 has a rectangular hole 53 that receives a left end portion of the boss 51. Therefore, the boss 51 is moved in the upper-lower direction in response to sliding of the slider 47 in the upper-lower direction. Accordingly, the substrate holder 41 can be swung around the support shafts 44 of the frame 43, with which the shaft engaging portions 42 at the left and right end portions of the substrate holder 41 are engaged. As a result, the detection direction of the human sensor 31 is changed. That is, the cylindrical boss 51 of the substrate holder 41 and the rectangular hole 53 of the slider 47 constitute a conversion mechanism that converts the movement in the upper-lower direction of the slider 47 into a swing of the substrate holder 41, and the swing changes the detection direction of the human sensor 31.

The operator 45 can be positioned at a plurality of positions. As seen in FIG. 6, the slider 47 includes a cantilever 56 that is elastically deformable. The cantilever 56 includes, at a free end portion of the cantilever 56, a claw 57 protruding to the right side. The slider support unit 48 includes a claw receiving part 58 having a plurality of recesses 59 that receive the claw 57.

The claw 57 of the cantilever 56 moves on the claw receiving part 58 of the slider support unit 48 as the slider 47 slides in the upper-lower direction. The cantilever 56 is elastically deformed when the claw 57 is located between the recesses 59. The cantilever 56 recovers from deformation when the claw 57 is located in one of the recesses 59. The claw 57 engages with this recess 59 while the claw 57 is urged towards the recess 59 by an elastic restoring force of the cantilever 56. Accordingly, movement of the claw 57 of the cantilever 56 is restricted. As a result, the operator 45 is positioned at one of the plurality of available positions (corresponding to the recesses 59). That is, the cantilever 56 of the slider 47 and the claw receiving part 58 of the slider support unit 48 constitute a positioning mechanism 55 that positions the operator 45 at any of a plurality of positions.

With respect to an operation to the operator 45 by a small force that is insufficient to release engagement between the claw 57 and the recess 59 against the restoring force of the cantilever 56, the positioning mechanism 55 maintains the engagement between the claw 57 and the recess 59, prevents the operator 45 from sliding, and keeps the operator 45 at the present position.

On the other hand, with respect to an operation to the operator 45 by a large force that is sufficient to release the engagement between the claw 57 and the recess 59 against the restoring force of the cantilever 56, the positioning mechanism 55 allows the operator 45 to slide.

The claw receiving part 58 has three recesses 59 in this example. Therefore, the operator 45 can be positioned in three steps (stages). The human sensor unit 16 adjusts the detection distance to a close distance when the claw 57 is engaged with the recess 59 at an upper portion. The human sensor unit 16 adjusts the detection distance to a normal distance when the claw 57 is engaged with the recess 59 at a center. The human sensor unit 16 adjusts the detection distance to a long distance when the claw 57 is engaged with the recess 59 at a lower portion.

The number of the recesses 59 of the claw receiving part 58 is an example and is not limited to three, and the number of the recesses 59 may be any other suitable number.

Figure 7:
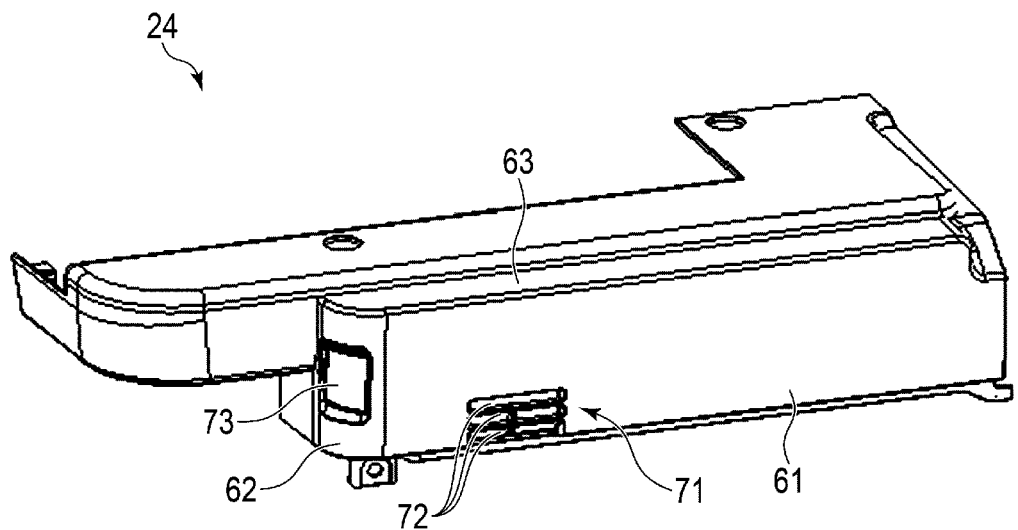
FIG. 7 is an enlarged perspective view of a sensor cover for an image forming device depicted in FIG. 1.

Next, the sensor cover 24 of the image forming device 10 of the first type in FIG. 1 will be representatively described. FIG. 7 is a perspective view of the sensor cover 24. The sensor cover 24 is an exterior cover that covers the human sensor unit 16. The human sensor unit 16 is disposed within a height range of the sensor cover 24.

The sensor cover 24 is disposed at, for example, a position on a front and left side of the image forming device 10. In order to define a space in which the human sensor unit 16 is housed, the sensor cover 24 includes a front surface portion 61 that faces frontward, a rearward extending portion 62 that extends toward the rear side from a left end of the front surface portion 61, and an upper surface portion 63 that extends horizontally from upper ends of the front surface portion 61 and the rearward extending portion 62.

The sensor cover 24 has a detection window 71 through which the detection wave, for example, the infrared ray for the human sensor 31 passes, and an opening 73 through which the operator 45 of the adjustment mechanism 35 is exposed. The detection window 71 and the opening 73 are commonly formed with the sensor cover 24, and therefore, the sensor cover 24 can be formed at low cost.

The detection window 71 is formed in a left portion relative to a center of the front surface portion 61 in the left-right direction. Further, the detection window 71 is formed in a lower portion relative to a center of the front surface portion 61 in the upper-lower direction. The detection window 71 has a plurality of slits 72 that extend in the width direction.

The opening 73 is formed in the rearward extending portion 62. The rearward extending portion 62 is curved outward. The rearward extending portion 62 forms a curved corner portion on the front and left side of the image forming device 10. The opening 73 has a height corresponding to the sliding amount (movement range) of the operator 45 in the upper-lower direction. That is, a height dimension of the opening 73 is larger than a sum of a height of the protrusion 46 of the operator 45 and the sliding amount of the operator 45 in the upper-lower direction. A transverse dimension along an outer surface of the rearward extending portion 62 for the opening 73 is larger than that of the protrusion 46 of the operator 45.

The human sensor unit 16 is disposed in a space that is defined by the front surface portion 61, the rearward extending portion 62, and the upper surface portion 63 of the sensor cover 24. That is, the human sensor unit 16 is disposed behind the front surface portion 61 of the sensor cover 24. Further, the human sensor unit 16 is disposed near the rearward extending portion 62.

The human sensor 31 is disposed behind the detection window 71. As illustrated in FIG. 1, the operator 45 of the adjustment mechanism 35 is exposed through the opening 73 of the rearward extending portion 62. That is, the operator 45 is disposed on a sheet discharge direction side of the image forming device 10.

Figure 8:
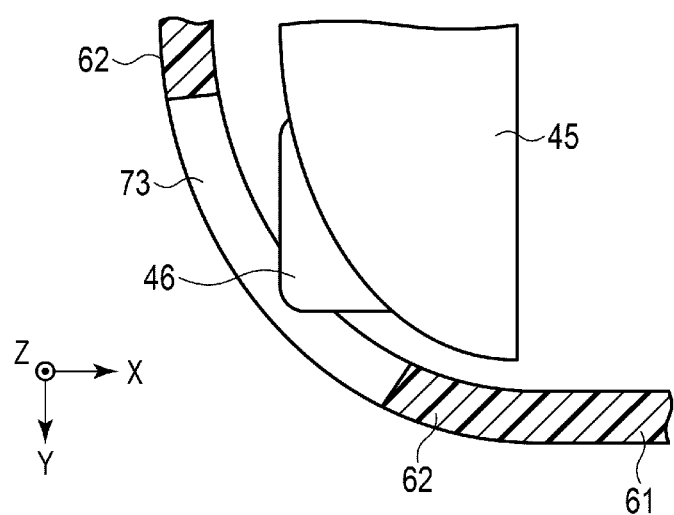
FIG. 8 is cross-sectional view of a sensor cover and an operator element.

FIG. 8 is a cross-sectional view of the operator 45 and the sensor cover 24 with the human sensor unit 16 being covered by the sensor cover 24, that is, in the state illustrated in FIG. 1. As is clear from FIGS. 1 and 8, the operator 45 of the human sensor unit 16 can be seen from both the front side and the lateral side through the opening 73 of the rearward extending portion 62.

As illustrated in FIG. 8, the operator 45 does not protrude beyond the sensor cover 24. That is, the operator 45, including the protrusion 46, is disposed inward of the outer surface of the rearward extending portion 62.

Figure 9:
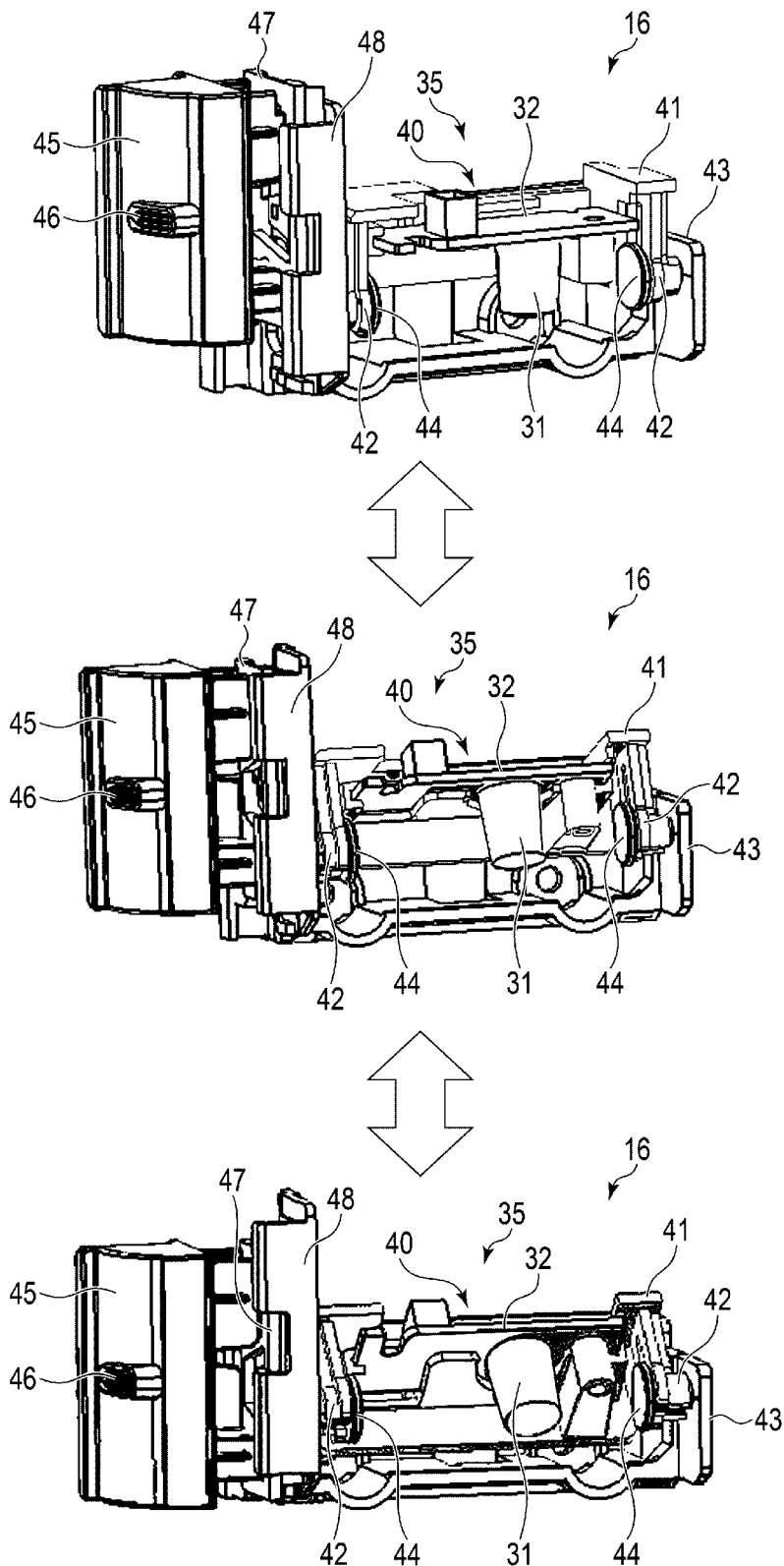
FIG. 9 depicts a human sensor unit in states in which a detection distance has been adjusted to a close distance, a normal distance, and a long distance.
Figure 10:
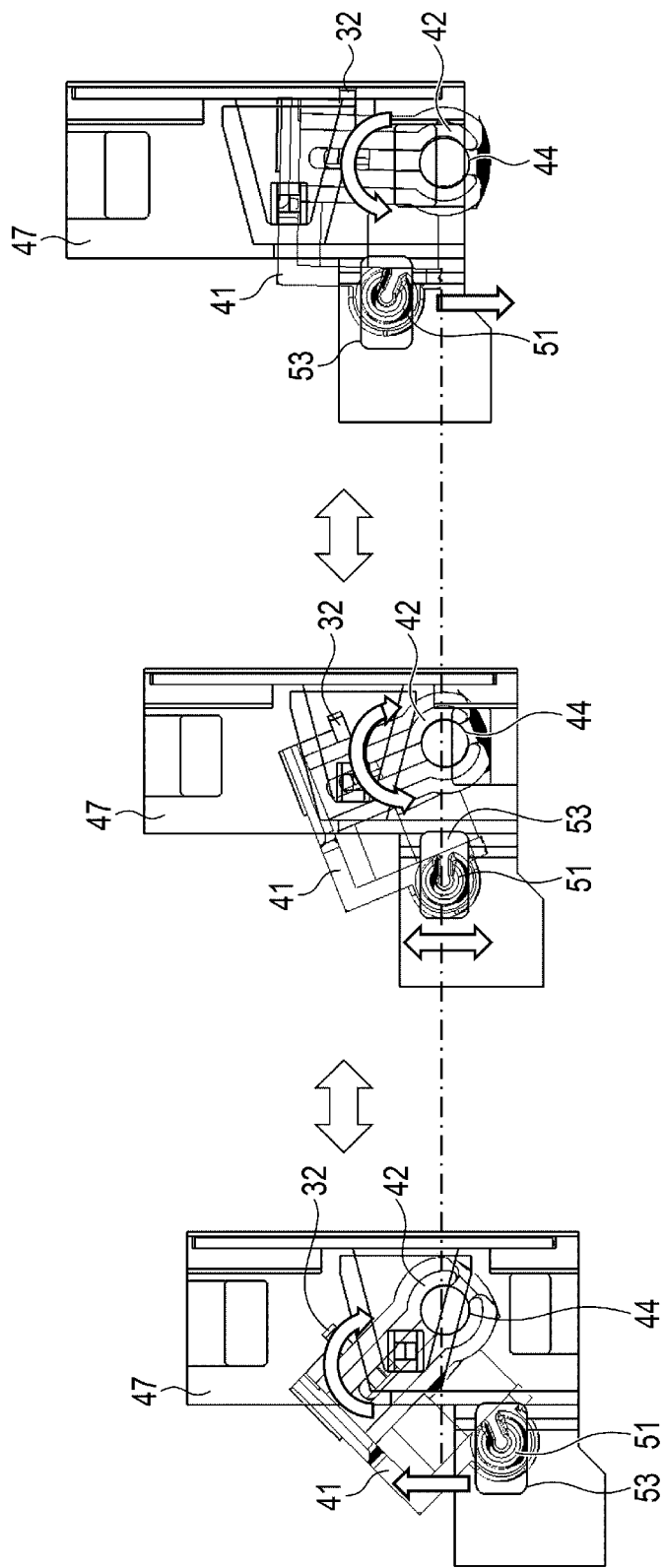
FIG. 10 are side views of a slider and a substrate holder in different states.
Figure 11:
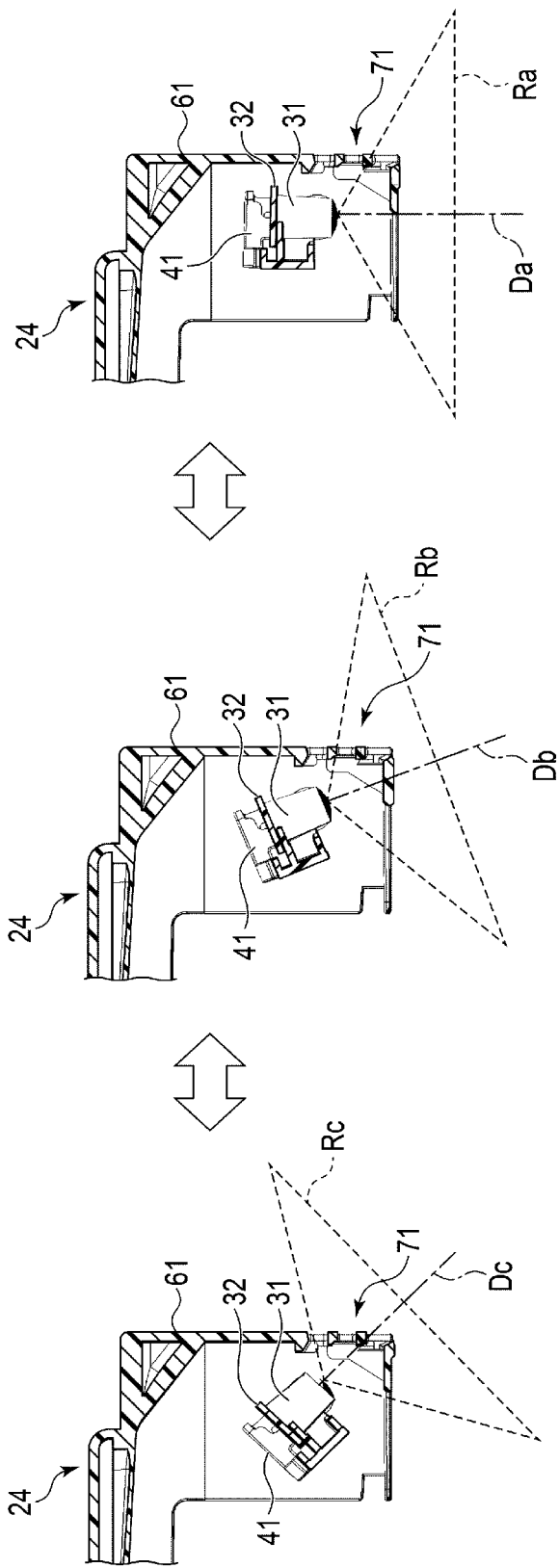
FIG. 11 are side views of a human sensor in different states.
Figure 12:
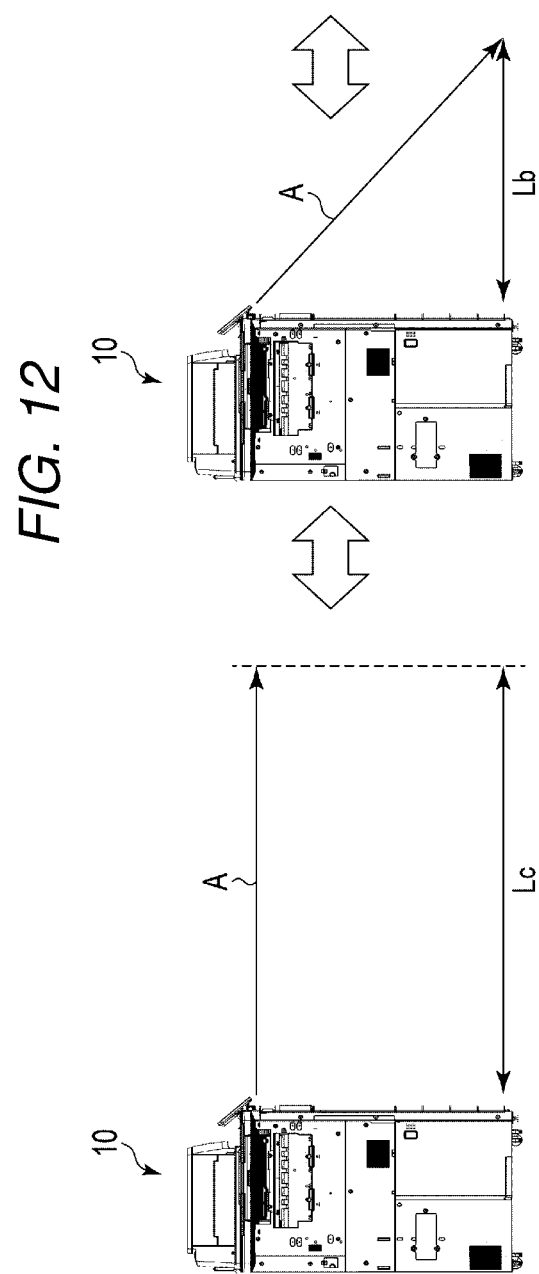
FIG. 12 are side views of an image forming device in different states.

Aspects of the adjustments of the detection distance of the human sensor 31 in the human sensor unit 16 will be described with reference to FIGS. 9 to 12. States in which the detection distance of the human sensor 31 is adjusted to the close distance, the normal distance, and the long distance are depicted in each of FIGS. 9 to 12. FIG. 9 depicts perspective views of the human sensor unit 16. FIG. 10 depicts side views of the slider 47 and the substrate holder 41. FIG. 11 depicts side views of the human sensor 31. FIG. 12 depicts side views of the image forming device 10.

In FIG. 9, a state in which the detection distance is adjusted to the close distance is depicted in an upper drawing portion, a state in which the detection distance is adjusted to the normal distance is depicted in a middle drawing portion, and a state in which the detection distance is adjusted to the long distance is depicted in a lower drawing portion. In each of FIGS. 10 to 12, the state in which the detection distance is adjusted to the close distance is depicted in a right drawing portion, the state in which the detection distance is adjusted to the normal distance is depicted in a middle drawing portion, and the state in which the detection distance is adjusted to the long distance is depicted in a left drawing portion.

When detection distance is adjusted to the close distance, as illustrated in the upper drawing of FIG. 9 and the right drawing of FIG. 10, the operator 45 and the slider 47 are positioned on an upper step of the three steps, the claw 57 of the cantilever 56 of the slider 47 is engaged with the recess 59 at the upper portion (see FIG. 6), and the substrate 32 is horizontally disposed. Therefore, as illustrated in the right drawing of FIG. 11, a detection direction Da of the human sensor 31 faces downwardly, and a detection range Ra of the human detection sensor 31 extends in the conical shape around the detection direction Da facing downwardly.

The range within which the human sensor 31 can actually detect a person is a part of the detection range Ra which extends through the detection window 71 of the sensor cover 24. As a result, as illustrated in the right drawing of FIG. 12, the detection distance of the human sensor 31 is close distance La. In FIG. 12, an arrow A indicates a boundary of the range within which a person can be detected by the human sensor 31 through the detection window 71 on a plane extending in the upper-lower direction and the front-rear direction.

When the operator 45 is slid towards the lower side to shift from the state illustrated in the upper drawing of FIG. 9 to the state illustrated in the middle drawing of FIG. 9, the slider 47 is accordingly slid towards the lower side to shift from the state illustrated in the right drawing of FIG. 10 to the state illustrated in the middle drawing of FIG. 10. Accordingly, the boss 51 of the substrate holder 41 to be engaged with the rectangular hole 53 of the slider 47 is moved to the lower side. Accordingly, the substrate holder 41 is rotated counterclockwise about the support shafts 44 of the frame 43, with which the shaft engaging portions 42 of the substrate holder 41 are engaged. As a result, the detection direction of the human sensor 31 is rotated from the lower side towards the front side.

When the claw 57 of the cantilever 56 of the slider 47 is engaged with the recess 59 at the center (see FIG. 6), as illustrated in the middle drawing of FIG. 9 and the middle drawing of FIG. 10, the operator 45 and the slider 47 are positioned on a middle step of the three steps, and shift to the state in which the detection distance is adjusted to the normal distance. In this state, as illustrated in the middle drawing of FIG. 11, a detection direction Db of the human sensor 31 faces downwardly but more to the front than before, and a detection range Rb of the human sensor 31 extends in the conical shape around the detection direction Db which is angled with respect to the vertical direction.

The range within which the human sensor 31 can actually detect a person is the part of the detection range Rb that extends through the detection window 71 of the sensor cover 24. As a result, as illustrated in the middle drawing of FIG. 12, the detection distance of the human sensor 31 becomes normal distance Lb.

When the operator 45 is slid towards the lower side to shift from the state illustrated in the middle drawing of FIG. 9 to the state illustrated in the lower drawing of FIG. 9, the slider 47 is accordingly slid towards the lower side to shift from the state illustrated in the middle drawing of FIG. 10 to the state illustrated in the left drawing of FIG. 10. Accordingly, the boss 51 of the substrate holder 41 is moved towards the lower side by the slider 47, the substrate holder 41 is rotated counterclockwise about the support shafts 44 of the frame 43, and the detection direction of the human sensor 31 is further rotated towards the front side.

When the claw 57 of the cantilever 56 of the slider 47 is engaged with the recess 59 at the lower portion (see FIG. 6), as illustrated in the lower drawing of FIG. 9 and the left drawing of FIG. 10, the operator 45 and the slider 47 are positioned on a lower portion of the three steps, and shift to the state in which the detection distance is adjusted to the long distance. In this state, as illustrated in the left drawing of FIG. 11, a detection direction Dc of the human sensor 31 further faces more frontward than the detection direction Db, and a detection range Rc of the human sensor 31 extends in the conical shape around the detection direction Dc facing more frontward than before.

The range within which the human sensor 31 can actually detect a person is the part of the detection range Rc that extends through the detection window 71 of the sensor cover 24. As a result, as illustrated in the left drawing of FIG. 12, the detection distance of the human sensor 31 becomes long distance Lc.

Operations of sliding the operator 45 towards the lower side from an upper position is described above, but operations of sliding the operator 45 towards the upper side from a lower position may be easily inferred from the above description.

Figure 13:
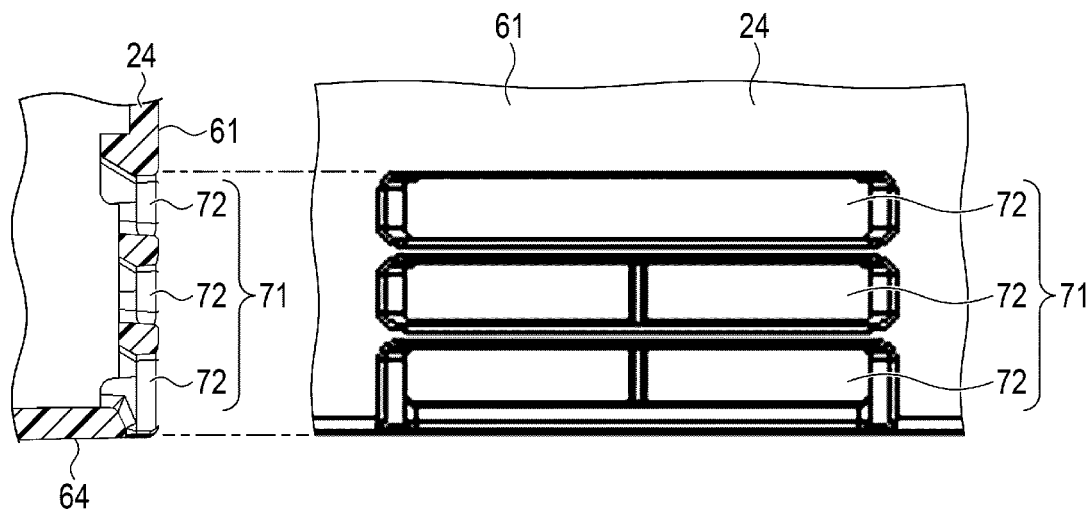
FIG. 13 depicts aspects of a detection window formed in a sensor cover.

Next, a structure of the detection window 71 formed in the sensor cover 24 will be described with reference to FIG. 13. FIG. 13 includes a side cross-sectional view and a front view of the detection window 71. The side cross-sectional view of the detection window 71 is illustrated on the left, and the front view of the detection window 71 is illustrated on the right. Although not illustrated in FIG. 13, the human sensor 31 is disposed on the rear side of the detection window 71.

As illustrated in FIG. 13, the detection window 71 is formed in the lower portion of the front surface portion 61 that faces the front side. The detection window 71 has a plurality of slits 72. Three slits 72 are depicted in FIG. 13. The slits 72 extend in the width direction and are one above the other in the vertical direction.

No optical component (e.g., lens, filter, or the like) to pass the detection wave is disposed in front of the human sensor 31. Therefore, the human sensor 31 is not affected by reflection, refraction, or the like of the detection wave by any optical component that might otherwise be positioned on the front side of the human sensor 31. Since the detection wave is received directly by the human sensor 31 without passing through an optical component, the human sensor 31 is useful for efficiently detecting a person. The detection window 71 has a plurality of slits 72, and thus is useful for obtaining a long detection distance. Each slit 72 is a size at which entry of a finger, a pen, or the like is prevented. Therefore, it is possible to prevent fingers, pens, or the like from unintentionally or inadvertently touching the human sensor 31, and it is possible to avoid damage to the human sensor 31.

The lowermost slit 72 is open towards the lower side direction. That is, the lowermost slit 72 is formed at a lower end of the front surface portion 61 of the sensor cover 24. Therefore, dust is not accumulated in the lowermost slit 72. In addition, entry of the dust into the sensor cover 24 is also reduced.

Figure 14:
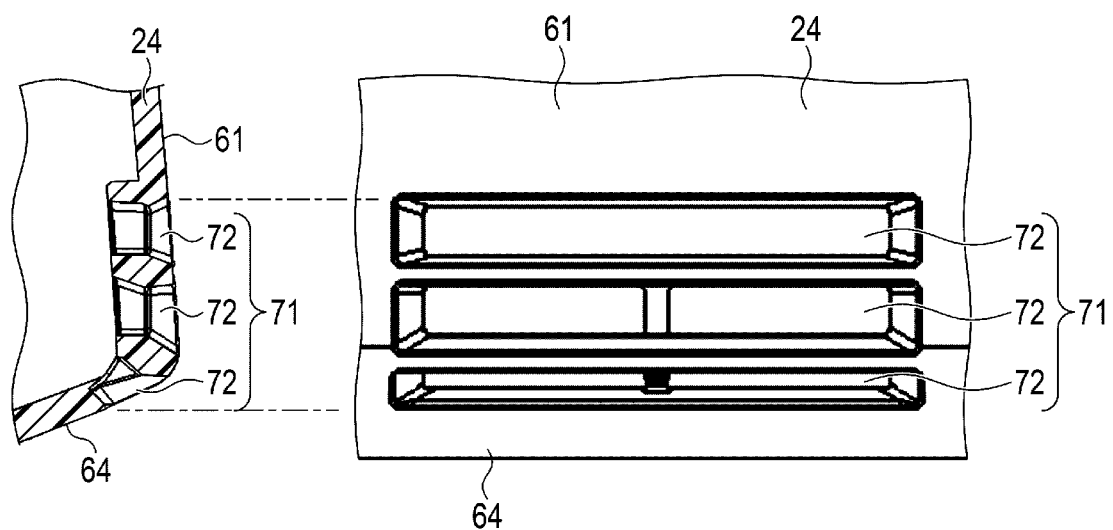
FIG. 14 depicts aspects of a sensor cover and a detection window according to a modification.

Next, structures of a sensor cover 24 and a detection window 71 according to a modification will be described with reference to FIG. 14. FIG. 14 includes a side cross-sectional view and a front view of the detection window 71. The side cross-sectional view of the detection window 71 is illustrated on the left, and the front view of the detection window 71 is illustrated on the right.

As illustrated in FIG. 14, the detection window 71 has three slits 72. The slits 72 extend in the width direction. Each slit 72 has a size at which entry of a finger, pen, or the like is prevented. Advantages and the like obtained by the structure of the detection window 71 provided with the slits 72 are similar to those in the case of FIG. 13.

The sensor cover 24 includes a front surface portion 61 that faces frontward and a lower surface portion 64 that faces downward. The lower surface portion 64 is continuous with the front surface portion 61, and extends obliquely toward the rear side from a lower end of the front surface portion 61.

The two upper slits 72 are formed in the front surface portion 61. The lowermost slit 72 is formed in the lower surface portion 64. The lowermost slit 72 is open towards the lower side (downward). Therefore, the dust is not accumulated in the lowermost slit 72. In addition, the entry of the dust into the sensor cover 24 is also reduced.

Figure 15:
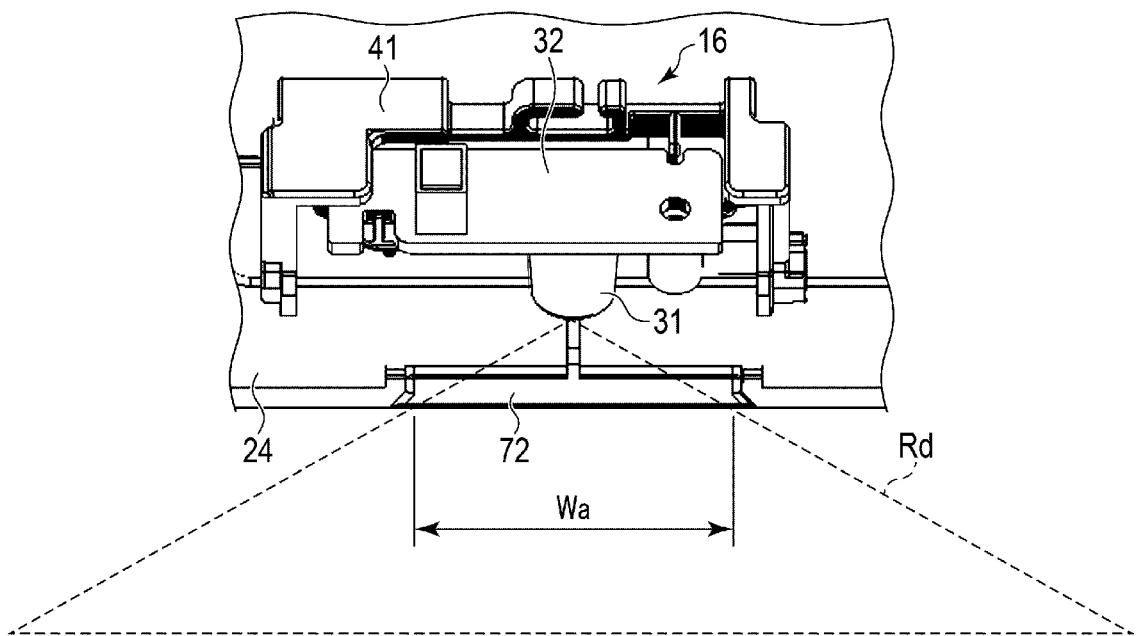
FIG. 15 is a diagram illustrating a combination of a human sensor unit and a sensor cover.
Figure 16:
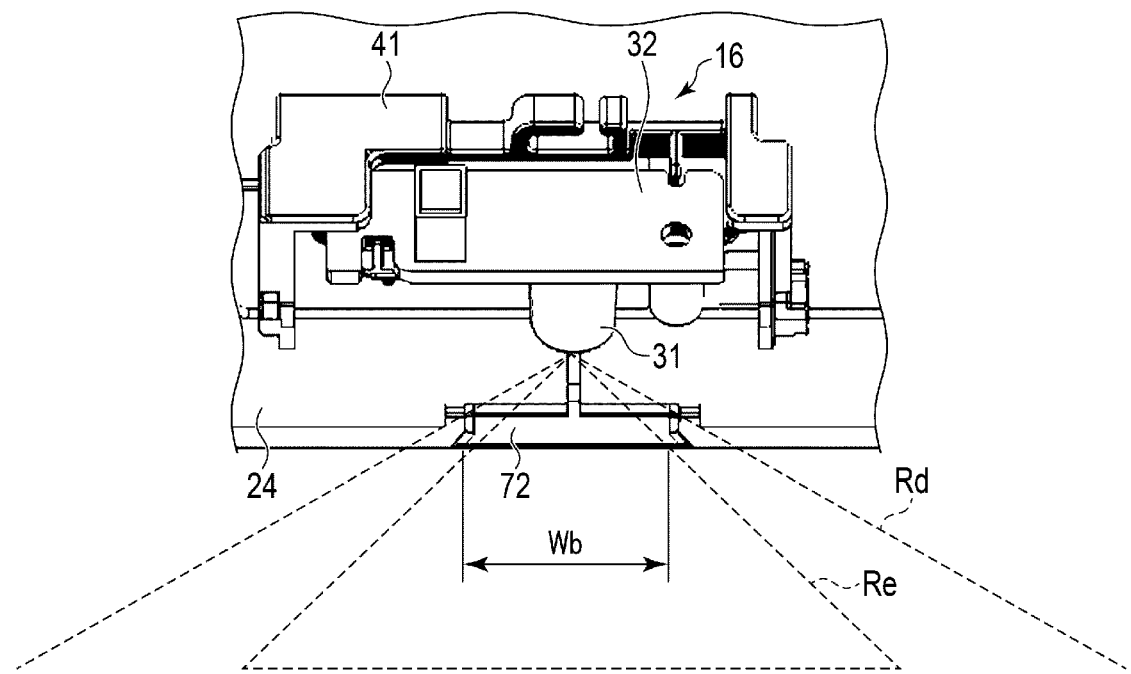
FIG. 16 is a diagram illustrating a combination of a human sensor unit and another sensor cover.

Next, the combination of the human sensor unit 16 and the sensor cover 24 will be described with reference to FIGS. 15 and 16. FIGS. 15 and 16 depict the human sensor unit 16 and the sensor cover 24 as viewed from the upper side. In FIGS. 15 and 16, just the human sensor 31, the substrate 32, and the substrate holder 41 of the human sensor unit 16 are depicted for explanatory simplicity.

In FIGS. 15 and 16, the human sensor unit 16 is the same in each, but the sensor covers 24 are different for each. Specifically, a first combination example of the human sensor unit 16 and the sensor cover 24 illustrated in FIG. 15 and a second combination example of the human sensor unit 16 and the sensor cover 24 illustrated in FIG. 16 are different in a width of the slits 72 formed in the sensor cover 24. In FIGS. 15 and 16, only one slit 72 is depicted for convenience, but a plurality of slits 72 can be considered present.

In the example of FIG. 15, the slit 72 formed in the sensor cover 24 has a width Wa. The width Wa does not block the detection range Rd of the human sensor 31 in the transverse direction.

On the other hand, in the example of FIG. 16, the slit 72 formed in the sensor cover 24 has a width Wb (narrower than the width Wa). The width Wb partially blocks the detection range Rd of the human sensor 31 and thus limits the detection range Rd to a detection range Re in the transverse direction.

Therefore, a range in the transverse direction within which the human sensor unit 16 can actually detect a person through the slit 72 in the combination example of FIG. 15 is wider than that in the combination example of FIG. 16.

An appropriate detection range in the transverse direction of the human sensor unit 16 can be determined according to a use, experiment, or the like. For example, the example of FIG. 15 in which the detection range in the transverse direction is wide may be adopted for the image forming device 10 of the large type illustrated in FIG. 1, and the example of FIG. 16 in which the detection range in the transverse direction is narrow may be adopted for the image forming device 10 of the small type illustrated in FIG. 2.

Figure 17:
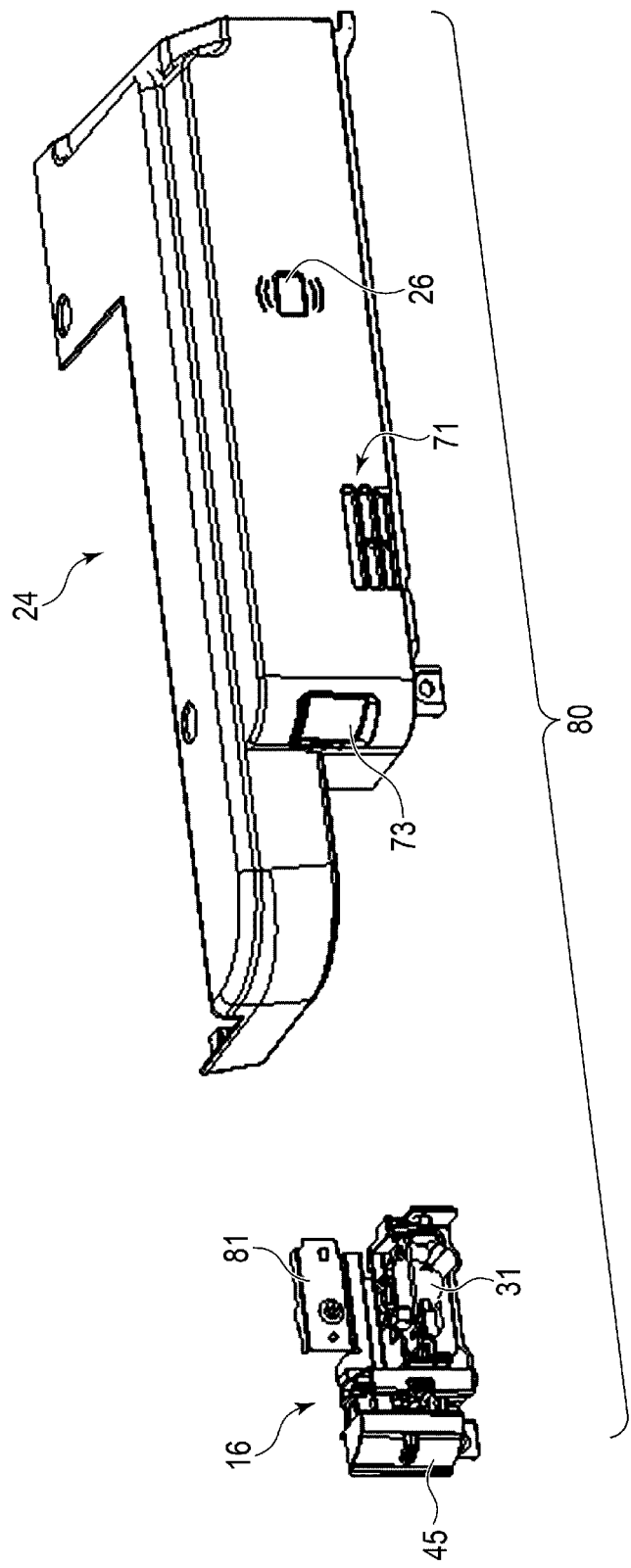
FIG. 17 is a perspective view of an option unit including a human sensor unit and a sensor cover.

Next, an option unit 80 (also referred to as an "optional unit 80" or "add-on unit 80") including a human sensor unit 16 and a sensor cover 24 will be described with reference to FIG. 17. FIG. 17 is a perspective view of the option unit 80.

In general, the image forming device 10 may have different mounted functions depending on a difference in model or the like even if the general type is the same. For example, some versions of an image forming device 10 may not include the human sensor unit 16 or may not include the card reader 26 according to user preference. In addition, in some instances, the necessity of functions corresponding to those related to a human sensor 16 and/or card reader 26 might not be apparent initially to a user, but use or the like may generate a demand to add these functions subsequently.

The option unit 80 responds to such a demand. The option unit 80 includes the human sensor unit 16 and the sensor cover 24. The sensor cover 24 has the detection window 71 for the human sensor 31 of the human sensor unit 16, and the opening 73 for the operator 45 of the human sensor unit 16. The sensor cover 24 further incorporates a card reader 26.

Even if the image forming device 10 is a basic model having just the minimum functions, it is common that the wiring necessary for those units or the like mounted on a higher model will anyways be incorporated in the image forming device 10 from the start even though the higher model units are not themselves provided with the basic model. The human sensor unit 16 includes a mounting portion 81 for mounting of the human sensor unit 16 to the sensor cover 24 and for connection of wiring of the image forming device 10.

Therefore, the user can easily add a desired function to the image forming device 10 by removing the existing cover to be replaced with the sensor cover 24, connecting the wiring for the human sensor unit 16, and mounting the human sensor unit 16 and the sensor cover 24 to the image forming device 10.

According to the image forming device 10 of the embodiment described above, since the operator 45 that adjusts the detection distance of the human sensor 31 is exposed through the opening 73 of the sensor cover 24 on the sheet discharge direction side so as to be seen from both the front side and the lateral side, the user can adjust the detection distance of the human sensor 31.

The human sensor unit 16 is disposed at substantially the same height as the operation panel 11. Therefore, the operator 45 is disposed at a height at which the operator 45 can be easily operated by a user. Accordingly, the user can easily operate the operator 45 without greatly changing a posture.

The operator 45 is slidable in the upper-lower direction. Therefore, the detection distance of the human sensor 31 can be adjusted by a simple operation. It is possible to visually grasp a current adjustment state of the detection distance of the human sensor 31 based on a position of the protrusion 46 in the upper-lower direction.

Since the operator 45 is disposed on the sheet discharge direction side, the operator 45 is relatively distant from the operation panel 11. Therefore, it is possible to avoid a situation in which the operator 45 is erroneously moved during an operation on the operation panel 11. It is possible to efficiently operate the operation panel 11 and the operator 45 without worrying about making a mistake. For example, it is possible to slide the operator 45 with a left hand while operating the operation panel 11 with a right hand.

The operator 45 is exposed through the opening 73 formed in the rearward extending portion 62 of the sensor cover 24 so as to be seen from both the front side and the lateral side. Therefore, it is easy to access the operator 45 when operating the operator 45. In addition, it is possible to easily find the operator 45, and the user does not get confused about finding the operator 45.

The operator 45 does not protrude from the sensor cover 24. Therefore, unintended and inadvertent contact with the operator 45 is less likely. Accordingly, undesired changes in the detection distance of the human sensor 31 are reduced.

The operator 45 can be positioned at a plurality of positions. Therefore, it is possible to prevent the operator 45 from being slid and the detection distance of the human sensor 31 being undesirably changed due to light contact with the operator 45.

In an embodiment, the operator 45 is slidable in the upper-lower direction, but embodiments are not limited thereto. In general, as long as the operator 45 can be manually operated by the user, the operator 45 may adopt another basic structure, for example, a rotary dial. Preferably, a mark is attached to the rotary dial so that the presently set detection distance of the human sensor 31 can be seen.

The adjustment mechanism 35 has a configuration in which the detection distance of the human sensor 31 is adjusted by changing the detection direction of the human sensor 31, but is not limited thereto, and may have other configurations. For example, the adjustment mechanism 35 may have a configuration in which the detection distance of the human sensor 31 is adjusted by providing a slider or the like in the human sensor 31 and changing a position of the slider.

While certain embodiments of the disclosure have been described, these embodiments are presented as examples and are not intended to limit the scope of the disclosure. These novel embodiments are capable of being implemented in various forms, and various omissions, substitutions, and modifications may be made without departing from the scope of the disclosure. The embodiments and the modification thereof are included in the scope and the spirit of the disclosure and are also included in the disclosure described in the scope of claims and an equivalent scope thereof.

What is claimed is:

1. An image forming device, comprising:
   a human sensor configured to detect a person in front of the image forming device;
   an adjustment mechanism configured to move the human sensor to adjust a detection distance of the human sensor; and
   a sensor cover panel on an exterior of the image forming device and configured to cover the human sensor and the adjustment mechanism, wherein
   the adjustment mechanism includes an operator element manually operable by a user to adjust the detection distance,
   the human sensor and the adjustment mechanism are disposed behind the sensor cover panel,
   the sensor cover panel has a detection window through which a detection wave for the human sensor can pass, and
   the sensor cover panel has an opening through which the operator element is exposed so as to be seen by a user from both the front side and a lateral side of the image forming device.

2. The image forming device according to claim 1, wherein
   the lateral side is on a sheet discharge direction side.

3. The image forming device according to claim 1, wherein
   the sensor cover panel includes a front surface portion that faces the front side and a rearward extending portion that extends toward a rear side from an end of the front surface portion.

4. The image forming device according to claim 3, wherein
   the detection window is formed in the front surface portion, and
   the opening is formed in the rearward extending portion.

5. The image forming device according to claim 1, wherein the detection window comprises a plurality of slits in the sensor cover panel.

6. The image forming device according to claim 5, wherein a lowermost slit in the plurality of slits is at a lower edge of the sensor cover panel.

7. The image forming device according to claim 1, wherein the human sensor is a pyroelectric infrared sensor.

8. The image forming device according to claim 1, wherein
   a sensor element of the human sensor is vertically mounted on a substrate, and
   the adjustment mechanism changes an angle of the substrate to change the detection distance of the human sensor.

9. The image forming device according to claim 1, wherein the adjustment mechanism changes a pointing angle of the human sensor to change the detection distance of the human sensor.

10. The image forming device according to claim 1, further comprising:
    an operation panel configured to accept an input operation instruction from a user, wherein
    the human sensor and the adjustment mechanism are disposed to one side of the operation panel in a lateral direction of the image forming device.

11. The image forming device according to claim 10, further comprising:
    a card reader configured to receive authentication information for a user from a card medium, wherein
    the card reader is between the human sensor and the operation panel in the lateral direction.

12. The image forming device according to claim 1, further comprising:
    a card reader configured to receive authentication information for a user from a card medium, wherein
    the card reader is covered by the sensor cover panel.

13. The image forming device according to claim 1, wherein
    the sensor cover panel includes a front surface portion that faces forward and a lower surface portion that extends rearward from a lower end of the front surface portion and faces downward, and
    at least part of the detection window is formed in the lower surface portion.

14. A multifunctional peripheral apparatus, comprising:
    a housing;
    a printer unit in the housing;
    a discharge tray on an exterior of the housing to receive printed sheets from the printer unit;
    an operation panel to receiver user inputs for controlling the printer unit;
    a sensor cover panel on the exterior of the housing at a same height as the operation panel;
    a human sensor behind a window in the sensor cover panel and configured to detect a person in front of the housing;
    an adjustment operator element exposed in an opening in the sensor cover panel, the adjustment operator element mechanically linked to the human sensor and configured to move the human sensor to adjust a detection distance of the human sensor when the adjustment operator element is moved by a user; and
    a sensor cover panel on an exterior of the image forming device and configured to cover the human sensor and the adjustment mechanism.

15. The multifunctional peripheral apparatus according to claim 14, wherein the adjustment operator element comprises a lever, and the lever is visible to a user from the front of the housing and from a lateral side of the housing.

16. The multifunctional peripheral apparatus according to claim 14, wherein the discharge tray is above the human sensor.

17. The multifunctional peripheral apparatus according to claim 14, wherein the discharge tray is below the human sensor.

18. The multifunctional peripheral apparatus according to claim 14, wherein the window comprises a plurality of slots one above another.

19. An add-on sensor panel cover for an exterior of an image forming device, the add-on sensor panel cover comprising:
    a detection window for a human sensor connected to the image forming device, the detection window comprising a plurality of slots, one above another; and
    an opening for an operator element of an adjustment mechanism that is mechanically linked to the human sensor, the operator element being exposed by the opening when the add-on sensor panel cover is mounted on the exterior of the image forming device.

20. An add-on unit for an image forming device, the add-on unit comprising:
    an add-on sensor cover panel according to claim 19;

a human sensor connectable to an image forming device; and an adjustment mechanism configured to adjust a detection distance of the human sensor when an operator element of the adjustment mechanism is moved by a user.

* * * * *